(12) United States Patent
Zhang et al.

(10) Patent No.: US 12,010,574 B2
(45) Date of Patent: Jun. 11, 2024

(54) WIRELESS COMMUNICATION METHOD, WIRELESS COMMUNICATIONS DEVICE, AND PROCESSOR-READABLE STORAGE MEDIUM

(71) Applicant: HUAWEI TECHNOLOGIES CO., LTD., Guangdong (CN)

(72) Inventors: Jinfang Zhang, Shenzhen (CN); Zhengzheng Xiang, Shanghai (CN); Hongjia Su, Shanghai (CN); Lei Lu, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 123 days.

(21) Appl. No.: 17/007,580

(22) Filed: Aug. 31, 2020

(65) Prior Publication Data

US 2020/0404560 A1 Dec. 24, 2020

Related U.S. Application Data

(63) Continuation of application No. PCT/CN2019/076007, filed on Feb. 25, 2019.

(30) Foreign Application Priority Data

Mar. 1, 2018 (CN) .......................... 201810171152.6

(51) Int. Cl.
*H04W 36/06* (2009.01)
*H04W 72/0453* (2023.01)
(Continued)

(52) U.S. Cl.
CPC ....... *H04W 36/06* (2013.01); *H04W 72/0453* (2013.01); *H04W 76/27* (2018.02); *H04W 76/36* (2018.02); *H04W 92/18* (2013.01)

(58) Field of Classification Search
CPC ..... H04W 36/06; H04W 76/36; H04W 76/27; H04W 72/0453; H04W 92/18;
(Continued)

(56) References Cited

U.S. PATENT DOCUMENTS

| 8,400,998 B2 * | 3/2013 | Kuchibhotla ......... H04W 72/20 370/348 |
| 2008/0049690 A1 * | 2/2008 | Kuchibhotla ......... H04L 5/0044 370/338 |

(Continued)

FOREIGN PATENT DOCUMENTS

| CN | 105681439 A | 6/2016 |
| CN | 106211239 A | 12/2016 |

(Continued)

OTHER PUBLICATIONS

Huawei, HiSilicon, Solutions to Rel-14 and Rel-15 UE pool sharing. 3GPP TSG RAN WG1 Meeting #92, Athens, Greece, Feb. 26-Mar. 2, 2018, R1-1801422, 3 pages.

*Primary Examiner* — Ayaz R Sheikh
*Assistant Examiner* — Louis Samara
(74) *Attorney, Agent, or Firm* — WOMBLE BOND DICKINSON (US) LLP

(57) ABSTRACT

When a quantity of radio resources available for a terminal device is less than a quantity of required radio resources, the terminal device sends a request to another terminal device, to request the another terminal device to release at least one radio resource currently used by the another terminal device (Continued)

or reselect a radio resource. The another terminal device that receives the request may autonomously release or request a network to release the at least one radio resource currently used by the another terminal device, or autonomously reselect or request a network to reselect the radio resource, and send a response to the terminal that sends the request. Nonconsecutive fragmented radio resources may be integrated into consecutive and relatively large radio resources, so that radio resource fragments are reduced, and the terminal device can send control information and data in a timely manner, thereby improving radio resource utilization.

20 Claims, 7 Drawing Sheets

(51) Int. Cl.
*H04W 76/27* (2018.01)
*H04W 76/36* (2018.01)
*H04W 92/18* (2009.01)

(58) Field of Classification Search
CPC ... H04W 76/14; H04W 72/0426; H04W 4/70; H04W 28/08; H04W 24/10; H04W 72/20; H04W 56/001; H04W 72/046; H04L 5/0092; H04L 5/0044
See application file for complete search history.

(56) References Cited

U.S. PATENT DOCUMENTS

| | | | |
|---|---|---|---|
| 2013/0201847 A1* | 8/2013 | Chincholi | H04W 28/08 370/254 |
| 2016/0135200 A1* | 5/2016 | Brahmi | H04W 72/046 370/329 |
| 2017/0005848 A1* | 1/2017 | Zheng | H04W 56/001 |
| 2017/0034863 A1* | 2/2017 | Zhang | H04W 74/08 |
| 2017/0230939 A1 | 8/2017 | Rudolf et al. | |
| 2017/0295601 A1* | 10/2017 | Kim | H04W 72/20 |
| 2017/0325214 A1* | 11/2017 | Lu | H04W 4/70 |
| 2019/0069200 A1* | 2/2019 | Zhang | H04W 72/20 |
| 2021/0014791 A1* | 1/2021 | Freda | H04L 5/0053 |
| 2021/0076436 A1* | 3/2021 | Feng | H04W 8/24 |

FOREIGN PATENT DOCUMENTS

| | | | | |
|---|---|---|---|---|
| CN | 106464610 A | | 2/2017 | |
| CN | 107113803 A | | 8/2017 | |
| CN | 107277922 A | | 10/2017 | |
| CN | 109479315 A | * | 3/2019 | ............ H04W 24/10 |
| CN | 107801247 B | * | 4/2020 | ........ H04W 72/0453 |
| WO | 2015157991 A1 | | 10/2015 | |
| WO | 2017127192 A1 | | 7/2017 | |
| WO | 2017135883 A1 | | 8/2017 | |
| WO | WO-2020231302 A1 | * | 11/2020 | ............ H04W 72/02 |

* cited by examiner

WIRELESS COMMUNICATION METHOD, WIRELESS COMMUNICATIONS DEVICE, AND PROCESSOR-READABLE STORAGE MEDIUM

CROSS-REFERENCE TO RELATED APPLICATIONS

This application is a continuation of International Application No. PCT/CN2019/076007, filed on Feb. 25, 2019, which claims priority to Chinese Patent Application No. 201810171152.6, filed on Mar. 1, 2018. The disclosures of the aforementioned applications are hereby incorporated by reference in their entireties.

TECHNICAL FIELD

This application relates to the field of wireless communications technologies, and in particular, to a wireless communication method and apparatus.

BACKGROUND

The Internet of Vehicles (Vehicle-To-Everything) refers to information exchange between a vehicle and the outside, including manners such as vehicle-to-vehicle (V2V), vehicle-to-infrastructure (V2I), and vehicle-to-pedestrian (V2P), and is a basis and a key technology for smart automobiles, automatic driving, and an intelligent transportation system in the future.

Different from a conventional cellular network-based communication manner, terminal devices in the Internet of Vehicles may communicate with each other via a base station, or may directly communicate with each other on a sidelink (SL); in other words, data of both communication parties does not need to be forwarded by a base station.

Sidelink communication includes two communication modes: In a first communication mode, sidelink communication is performed based on scheduling of a base station, and a terminal device sends, on a scheduled radio resource based on scheduling information of the base station, control information and data of the sidelink communication. This is referred to as a mode 3 working mode. In a second communication mode, a terminal device listens to a sidelink communication resource pool, then selects, from available radio resources obtained through listening, a radio resource to be used for sidelink communication, and sends control information and data on the selected radio resource. This is referred to as a mode 4 working mode. The sidelink communication resource pool includes a plurality of radio resources, and the terminal device occupies, each time, one or more radio resources that are of the plurality of radio resources and that are consecutive in frequency domain, to send the control information and the data on a sidelink.

In the mode 4 working mode, because the terminal devices do not coordinate with each other when performing the sidelink communication, a resource in the sidelink communication resource pool may generate a plurality of radio resource fragments that are nonconsecutive in frequency domain, and the terminal devices cannot perform the sidelink communication by using fragmented radio resources. Consequently, radio resource utilization is reduced.

SUMMARY

Embodiments of the present invention provide a wireless communication method, a wireless communications device, and a processor-readable storage medium, to improve radio resource fragment utilization.

According to a first aspect, a wireless communication method is provided. In the method, a first terminal device sends a first request that is used to request a second terminal device to release a first radio resource. The first terminal device determines a first available radio resource set, where the first available radio resource set includes at least a part of the first radio resource, and radio resources included in the first available radio resource set are consecutive in frequency domain. The first terminal device sends information by using the first available radio resource set. Another terminal device is requested to release a radio resource, and a plurality of radio resource fragments can be integrated into a relatively large radio resource, so that the radio resource fragments can be used to send information, thereby improving resource fragment utilization.

In one embodiment, before the sending, by the terminal device, the first request, the method further includes: listening, by the first terminal device, to radio resources to obtain at least one second available radio resource set, where a quantity of radio resources included in each second available radio resource set is less than a quantity of target radio resources, and the radio resources included in each second available radio resource set are consecutive in frequency domain.

In one embodiment, the sending, by a first terminal device, a first request includes: sending, by the first terminal device, the first request by using one of the at least one second available radio resource set.

In one embodiment, before the determining, by the first terminal device, a first available radio resource set, the method further includes: listening, by the terminal device, to the at least a part of the first radio resource.

In one embodiment, before the determining, by the first terminal device, a first available radio resource set, the method further includes: receiving, by the first terminal device, a first response sent by the second terminal device.

According to a second aspect, a wireless communication method is provided. The wireless communication method includes: receiving, by a second terminal device, a first request sent by a first terminal device, where the first request is used to request the second terminal device to release a first radio resource; and releasing, by the second terminal device, the first radio resource based on the first request.

In one embodiment, after the receiving, by the second terminal device, the first request, the method further includes: listening, by the second terminal device, to radio resources to obtain at least one third available radio resource set, where radio resources included in each third available radio resource set are consecutive in frequency domain; and sending, by the second terminal device, information by using one of the at least one third available radio resource set, where the at least one third available radio resource set does not include the first radio resource.

In one embodiment, after the receiving, by the second terminal device, the first request, the method further includes: sending, by the second terminal device, a second request to a network device.

In one embodiment, the method further includes: receiving, by the second terminal device, a second response sent by the network device.

In one embodiment, the second terminal device sends a first response.

According to a third aspect, a wireless communications device is provided. The wireless communications device includes a processor and a transceiver coupled to the processor, where the transceiver is configured to send a first request that is used to request a second terminal device to release a first radio resource; the processor is configured to determine a first available radio resource set, where the first available radio resource set includes at least a part of the first radio resource, and radio resources included in the first available radio resource set are consecutive in frequency domain; and the transceiver is further configured to send information by using the first available radio resource set.

In one embodiment, before the sending, by the transceiver, the first request, the wireless communications apparatus further includes: the processor is configured to listen to radio resources via the transceiver to obtain at least one second available radio resource set, where a quantity of radio resources included in each second available radio resource set is less than a quantity of target radio resources, and the radio resources included in each second available radio resource set are consecutive in frequency domain.

In one embodiment, the sending, by the transceiver, the first request includes: the transceiver sends the first request by using one of the at least one second available radio resource set.

In one embodiment, the first available radio resource set includes the at least a part of the first radio resource and a part of the at least one second available radio resource set, and a quantity of radio resources included in the first available radio resource set is greater than or equal to the quantity of target radio resources.

In one embodiment, before the determining, by the processor, the first available radio resource set, the wireless communications device further includes:

the processor is configured to listen to the at least a part of the first radio resource via the transceiver.

In one embodiment, before the determining, by the processor, the first available radio resource set, the wireless communications device further includes: the processor is configured to: receive, via the transceiver, a first response sent by the second terminal device.

In one embodiment, before the determining, by the processor, the first available radio resource set, the wireless communications device further includes: the processor is configured to: receive, via the transceiver, a first response sent by the second terminal device.

According to a fourth aspect, a wireless communications device is provided. The wireless communications device includes a processor and a transceiver coupled to the processor, where the processor is configured to receive, via the transceiver, a first request sent by a first terminal device, where the first request is used to request the second terminal device to release a first radio resource; and the processor is further configured to release the first radio resource.

In one embodiment, after the receiving the first request, the wireless communications device further includes: the processor is configured to listen to radio resources via the transceiver to obtain at least one third available radio resource set, where radio resources included in each third available radio resource set are consecutive in frequency domain.

In one embodiment, the processor is further configured to send information by using one of the at least one third available radio resource set via the transceiver, where the at least one third available radio resource set does not include the first radio resource.

In one embodiment, after receiving the first request, the processor is further configured to send a second request to a network device via the transceiver.

In one embodiment, the processor is further configured to receive, via the transceiver, a second response sent by the network device.

In one embodiment, the wireless communications device further includes: the processor is further configured to send a first response via the transceiver.

In one embodiment, the first request in the foregoing aspects includes at least one of the following:

indication information used to indicate to release a radio resource; identification information or group identification information of the second terminal device; sidelink control information of the second terminal device; time information, where the time information is used to indicate an effective time of releasing the first radio resource; information about a radio resource that the second terminal device is recommended to select; information about a radio resource that the second terminal device is recommended to avoid selecting; information used to indicate a third radio resource, where the third radio resource does not include the first available radio resource set; or information used to indicate a fourth radio resource, where the fourth radio resource includes the first available radio resource set. The foregoing information is carried, and more precise radio resource release may be implemented. The foregoing information is carried, and a specific terminal device may be indicated to release a specific resource.

In one embodiment, the second request in the foregoing aspects includes at least one of the following: indication information used to indicate the first radio resource; the identification information or the group identification information of the second terminal device; the sidelink control information of the second terminal device; the time information, where the time information is used to indicate the effective time of releasing the first radio resource; information about a radio resource that the network device is recommended to select for the second terminal device; information about a radio resource that the network device is recommended to avoid selecting for the second terminal device; information used to indicate an eighth radio resource, where the eighth radio resource does not include the first radio resource; or information used to indicate a ninth radio resource, where the ninth radio resource includes the first radio resource.

In one embodiment, the first response in the foregoing aspects includes at least one of the following: the indication information used to indicate to release the first radio resource; indication information used to indicate to release a fifth radio resource, where the fifth radio resource is a part of the first radio resource; indication information used to indicate to release a sixth radio resource, where the first radio resource is a part of the sixth radio resource; or information used to indicate a seventh radio resource, where the seventh radio resource does not include the first radio resource.

In one embodiment, the second response in the foregoing aspects includes at least one of the following: the indication information used to indicate to release the first radio resource; indication information used to indicate to release a tenth radio resource, where the tenth radio resource is a part of the first radio resource; indication information used to indicate to release an eleventh radio resource, where the first radio resource is a part of the eleventh radio resource; or information used to indicate a twelfth radio resource, where the twelfth radio resource does not include the first radio resource.

According to a fifth aspect, a processor-readable storage medium is provided. The processor-readable storage medium includes an instruction, where when the instruction is run on a processor, the processor is enabled to perform the method in the foregoing aspects.

According to a sixth aspect, a wireless communications apparatus is provided. The wireless communications apparatus includes:

a processor and a memory connected to the processor, where the memory is configured to store an instruction, and the processor is configured to read and execute the instruction in the memory, so that the wireless communications apparatus performs the method in the foregoing aspects.

DESCRIPTION OF EMBODIMENTS

The following clearly and completely describes the technical solutions in embodiments of the present invention with reference to the accompanying drawings in the embodiments of the present invention. It should be noted that the technical solutions or features in the embodiments of the present invention may be mutually combined in a case of no conflict.

It should be understood that the present invention is applicable to a wireless communications system, for example, a long term evolution (LTE) device-to-device (D2D) communications system, an enhanced D2D communications system, and a communications system based on Internet of Vehicles (vehicle to everything) communication that includes vehicle-to-vehicle (V2V), vehicle-to-pedestrian (V2P), vehicle-to-infrastructure (V2I), and the like, and a communications system based on sidelink communication in a 5G communications system, and the like. In the embodiments of the present invention, V2V communication in the 5G communications system is used as an example. This does not constitute a limitation on the technical solutions provided in the embodiments of the present invention. A person of ordinary skill in the art may learn that with emergence of a new service scenario and evolution of a network architecture, the technical solutions provided in the embodiments of the present invention are also applicable to similar technical problems.

Figure 1:
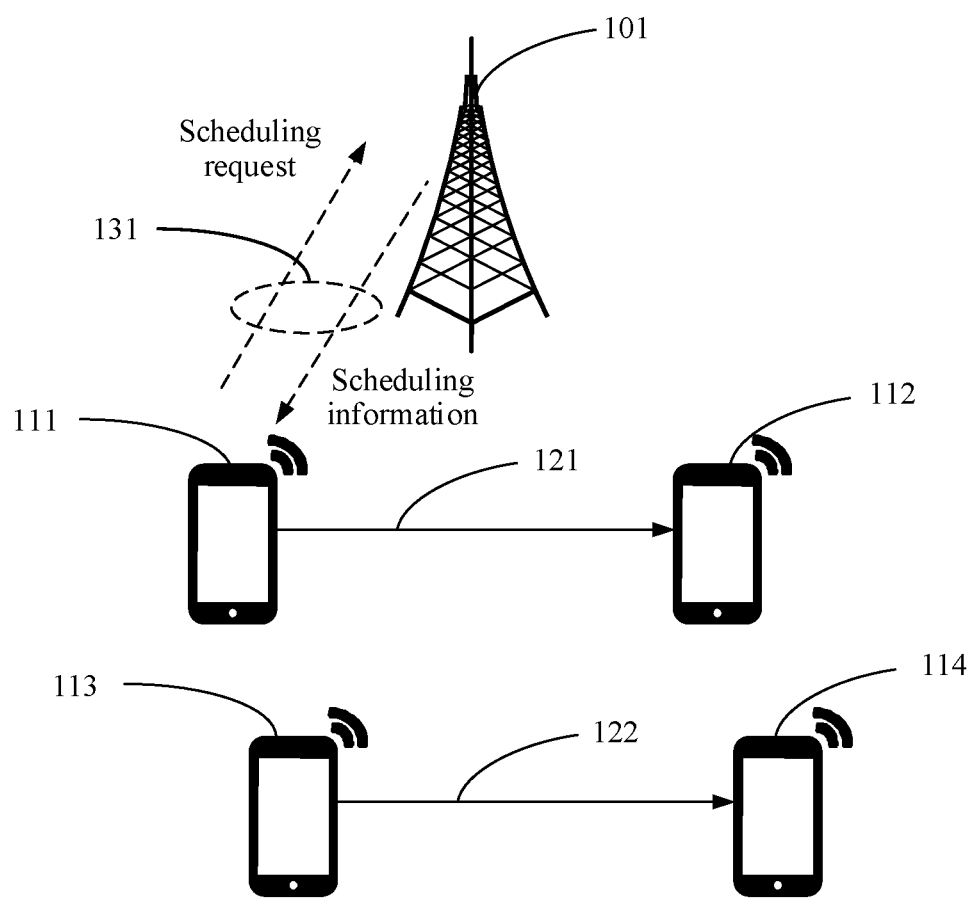
FIG. 1 is a schematic diagram of a wireless communications system to which an embodiment of the present invention is applied.

FIG. 1 shows an application scenario of an embodiment of the present invention. A wireless communications system in the scenario includes a network device 101 and terminal devices 111 to 114. Some or all of the terminal devices 111 to 114 may be located within coverage of the network device 101, or may be located outside coverage of the network device 101. When the terminal devices 111 to 114 are all located outside the coverage of the network device 101, the network device 101 in this embodiment of the present invention may not exist. In other words, in this case, in an application scenario of this embodiment of the present invention, the wireless communications system includes only the terminal devices 111 to 114. The network device 101 communicates with one or more of the terminal devices 111 to 114 by using an air interface (for example, in LTE and a 5G system, the air interface is a Uu interface). One of the terminal devices 111 to 114 communicates with another one or more of the terminal devices on a sidelink (for example, in LTE, the sidelink interface is a PC5 interface). As shown in FIG. 1, the terminal device 111 communicates with the terminal device 112 on a sidelink 121, and the terminal device 113 communicates with the terminal device 114 on a sidelink 122.

When the terminal devices communicate with each other on the sidelinks, two working modes are included: a mode 3 working mode and a mode 4 working mode.

In the mode 3 working mode, a terminal device requests a network device to allocate a radio resource for sidelink communication, and sends, on the allocated radio resource based on scheduling information of the network device, control information and data for the sidelink communication. As shown in FIG. 1, when the terminal device 111 and the terminal device 112 perform the sidelink communication, the terminal device 111 sends a scheduling request to the network device, to request the network device 101 to allocate a resource for the sidelink communication to the terminal device 111. Correspondingly, the network device 101 allocates the resource to the terminal device 111, and notifies, by using scheduling information, the terminal device 111 of the resource allocated to the terminal device 111. The terminal device 111 sends the control information and/or the data to another terminal device by using the resource.

In the mode 4 working mode, a terminal device listens to a sidelink communication resource pool, then selects, from at least one available radio resource obtained through listening, one or more radio resources to be used for sidelink communication, and sends control information and data on the selected one or more resources. The sidelink communication resource pool includes a plurality of radio resources, and the terminal device occupies, each time, one or more radio resources that are of the plurality of radio resources and that are consecutive in frequency domain, to send the control information and the data on a sidelink. As shown in FIG. 1, when the terminal device 113 and the terminal device 114 perform the sidelink communication, the mode 4 working mode is used.

In the embodiments of the present invention, a network device (for example, the network device 101) is an apparatus that is deployed in a radio access network and that is configured to provide a wireless communication function for a terminal device. The network device may include a macro base station, a micro base station (also referred to as a small cell), a relay node, an access point, and the like in various forms. In systems using different radio access technologies, names of devices having functions of the network device may be different. For example, the network device may be a base station (BTS) in GSM or CDMA, or may be a base station (NB) in WCDMA, or may be an evolved NodeB (evolutional NodeB, eNB, or e-NodeB) in LTE or eLTE, or may be a base station (next) generation NodeB (gNB), or a road side unit (RSU) in the V2X communication, or a chip or a system-on-a-chip (SOC) inside the foregoing network device or base station in a next-generation mobile network such as fifth generation (5G). For ease of description, in this application, these devices are referred to as a network device for short, and is sometimes referred to as a base station.

In the embodiments of the present invention, a terminal device may also be referred to as user equipment (UE), a mobile station (MS), a mobile terminal, or the like, and is a device having a wireless transceiver function. The terminal device may be deployed on land, including an indoor device, an outdoor device, a handheld device, or a vehicle-mounted device, or may be deployed on a water surface (such as a ship), or may be deployed in the air (for example, on an aircraft, a balloon, or a satellite). The terminal device may be a mobile phone, a tablet computer (Pad), a computer with a wireless transceiver function, a virtual reality (VR) terminal device, an augmented reality (AR) terminal device, a wireless terminal in industrial control, a wireless terminal in unmanned driving (self driving), a wireless terminal in telemedicine (remote medical), a wireless terminal in a smart grid, a wireless terminal in transportation safety, a wireless terminal in a smart city, a wireless terminal in a smart home, a wearable device, or the like. For ease of description, in this application, these devices are referred to as terminal devices or UE for short.

Figure 2:
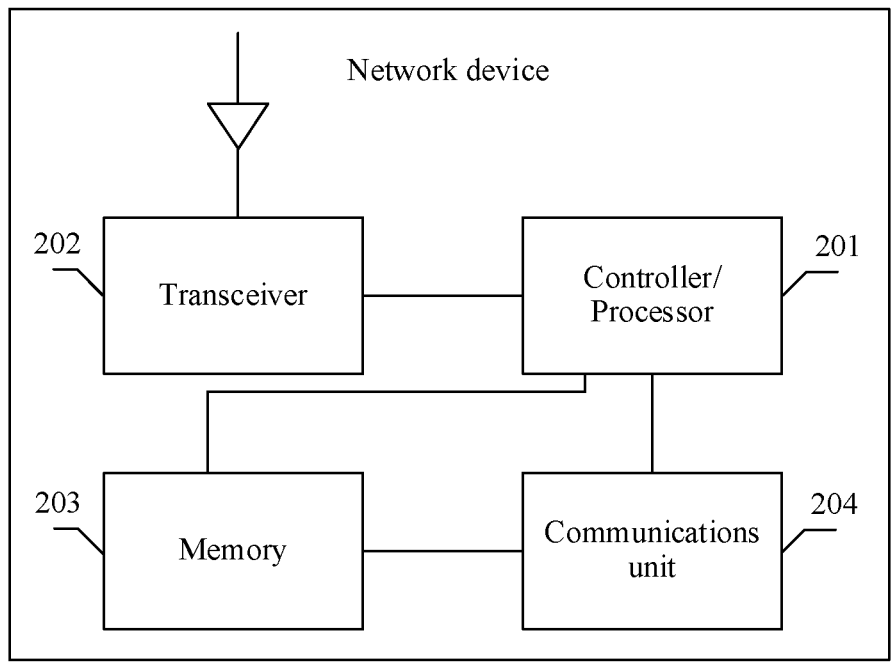
FIG. 2 is a possible schematic structural diagram of a network device in the foregoing wireless communications system.

FIG. 2 shows a wireless communications device according to an embodiment of the present invention. The wireless communications device may be used as a network device 101 or an apparatus applied to a network device 101. The following uses an example in which the wireless communications device is the network device 101 for description. The network device 101 can perform the method provided in the embodiments of the present invention. The network device 101 may include a processor 201 and a transceiver 202 that are configured to implement a wireless communication function.

The processor 201 may be a modem processor. The processor 201 may include a baseband processor (BBP). The baseband processor processes a received digitalized signal to extract information or a data bit carried in the signal. To achieve such an objective, the BBP is generally implemented by using one or more digital signal processors (DSP) in the processor 201 or by using separate integrated circuits (IC).

The transceiver 202 may be configured to support information receiving and sending between the network device 101 and a terminal device. In an uplink, an uplink radio frequency signal from the terminal device is received by using an antenna. The transceiver 202 demodulates the uplink radio frequency signal, extracts a baseband signal, and outputs the baseband signal to the processor 201 for processing, to restore service data and/or signaling information that are/is sent by the terminal device. In a downlink, a baseband signal that carries service data and/or a signaling message to be sent to the terminal device is modulated by the transceiver 202, to generate a downlink radio frequency signal, and the downlink radio frequency signal is transmitted to UE by using the antenna. The transceiver 202 may include independent receiver and transmitter circuits, or a receiver circuit and a transmitter circuit may be integrated into a same circuit to implement receiving and sending functions.

The network device 101 may further include a memory 203, and may be configured to store program code and/or data of the network device 101.

The network device 101 may further include a communications unit 204 that is configured to support the network device 101 in communicating with another network entity, for example, configured to support the network device 101 in communicating with a network device or the like in a core network.

In one embodiment shown in FIG. 2, the processor 201 may be coupled/connected to the transceiver 202, the memory 203, and the communications unit 204. In another alternative manner, the network device 101 may further include a bus. The transceiver 202, the memory 203, and the communications unit 204 may be connected to the processor 201 by using the bus. For example, the bus may be a peripheral component interconnect (PCI) standard bus, an extended industry standard architecture (EISA) bus, or the like. The bus may include an address bus, a data bus, a control bus, and the like.

Figure 3:
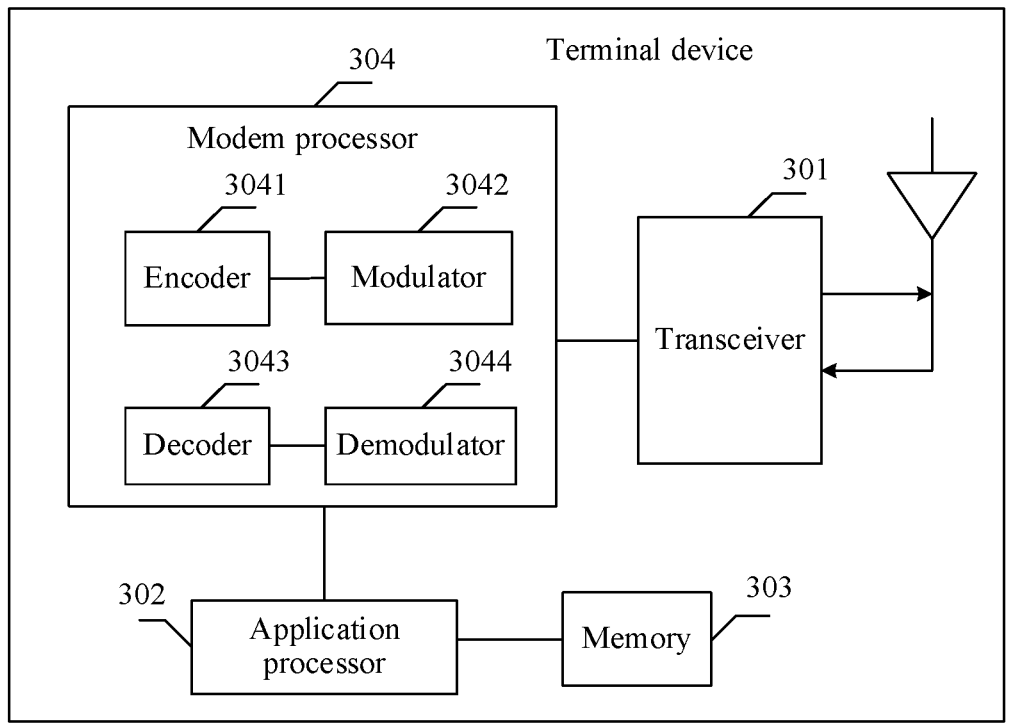
FIG. 3 is a possible schematic structural diagram of a terminal device in the foregoing wireless communications system.

FIG. 3 shows another wireless communications device according to an embodiment of the present invention. The wireless communications device may be used as one of terminal devices 111 to 114 or an apparatus applied to terminal devices 111 to 114. The following uses an example in which the wireless communications device shown in FIG. 3 is one of the terminal devices for description. The terminal device can perform the method provided in the embodiments of the present invention. The terminal device may be any one of the four terminal devices 111 to 114. The terminal device includes a transceiver 301, a memory 303, and a processor 304 that is configured to implement a wireless communication function.

The transceiver 301 may be configured to support information receiving and sending between the terminal devices 111 to 114 and a network device 101. In a downlink, a downlink radio frequency signal from the network device is received by using an antenna. The transceiver 301 demodulates the downlink radio frequency signal, extracts a baseband signal, and outputs the baseband signal to the processor 304 for processing, to restore service data and/or signaling information that are/is sent by the network device. In an uplink, a baseband signal that carries service data and/or a signaling message to be sent to the network device is modulated by the transceiver 301, to generate an uplink radio frequency signal, and the uplink radio frequency signal is transmitted to the network device by using the antenna. The transceiver 301 may include independent receiver and transmitter circuits, or a receiver circuit and a transmitter circuit may be integrated into a same circuit to implement receiving and sending functions.

The processor 304 may be a modem processor. The processor 304 may include a baseband processor (BBP). The baseband processor processes a received digitalized signal to extract information or a data bit carried in the signal. To achieve such an objective, the BBP is generally implemented by using one or more digital signal processors (DSP) in the processor 304 or by using separate integrated circuits (IC).

For example, as shown in FIG. 3, In one embodiment of the processor 304, the processor 304 may include an encoder 3041, a modulator 3042, a decoder 3043, and a demodulator 3044. The encoder 3041 is configured to encode a to-be-sent signal. For example, the encoder 3041 may be configured to: receive the service data and/or the signaling message that are/is to be sent on the uplink, and perform processing (for example, formatting, encoding, or interleaving) on the service data and the signaling message. The modulator 3042 is configured to modulate an output signal of the encoder 3041. For example, the modulator may perform processing such as symbol mapping and/or modulation on the output signal (data and/or signaling) of the encoder, and may provide an output sample. The demodulator 3044 is configured to demodulate an input signal. For example, the demodulator 3044 processes an input sample and provides symbol estimation. The decoder 3043 is configured to decode a demodulated input signal. For example, the decoder 3043 performs processing such as de-interleaving and/or decoding on the demodulated input signal, and outputs a decoded signal (data and/or signaling).

The processor 304 receives digital data that may represent voice, data, or control information, and processes the digital data for transmission. The processor 304 may support one or more of a plurality of wireless communications protocols of a plurality of communications systems, for example, a long term evolution (LTE) communications system, new radio (NR), a universal mobile telecommunications system (UMTS), and high speed packet access (HSPA). Optionally, the processor 304 may also include one or more memories.

The terminal device may further include an application processor 302 that is configured to generate the foregoing digital data that may represent the voice, the data, or the control information.

The processor 304 and the application processor 302 may be integrated into one processor chip.

The memory 303 is configured to store program code (sometimes referred to as a program, an instruction, software, or the like) and/or data that are/is used to support the terminal device in communication.

It should be noted that, the memory 203 or the memory 303 may include one or more storage units, for example, may be a storage unit that is inside the processor 201 or the processor 304 or the application processor 302 and that is used to store program code, or may be an external storage unit independent of the processor 201 or the processor 304 or the application processor 302, or may be a component including a storage unit that is inside the processor 201 or the processor 304 or the application processor 302 and an external storage unit that is independent of the processor 201 or the processor 304 or the application processor 302.

The processor 201 and the processor 304 may be processors of a same type, or may be processors of different types. For example, the processor 201 and processor 304 each may be implemented as a central processing unit (CPU), a general purpose processor, a digital signal processor (DSP), an application-specific integrated circuit (ASIC), a field programmable gate array (FPGA) or another programmable logic device, a transistor logic device, a hardware component, another integrated circuit, or any combination thereof. The processor 201 and the processor 304 may implement or execute various example logical blocks, modules, and circuits described with reference to content disclosed in the embodiments of the present invention. Alternatively, the processor may be a combination of components implementing computing functions, for example, a combination of one or more microprocessors, a combination of a DSP and a microprocessor, or a system-on-a-chip (SOC).

A person skilled in the art can understand that various explanatory logic blocks, modules, circuits, and algorithms described with reference to the various aspects disclosed in this application may be implemented as electronic hardware, an instruction that is stored in a memory or another computer-readable medium and that is executed by a processor or another processing device, or a combination thereof. As an example, the device described in this specification may be applied to any circuit, hardware component, IC, or IC chip. The memory disclosed in this application may be any type of memory in any size, and may be configured to store any type of required information. To clearly explain such interchangeability, various explanatory components, blocks, modules, circuits, and operations have been generally described above based on functionality of the explanatory components, blocks, modules, circuits, and operations. How to implement such functionality depends on a specific application, a design selection, and/or a design constraint that is imposed on an entire system. A person skilled in the art may use different manners to implement the described functionality for each particular application, but it should not be considered that such implementation goes beyond the scope of the present invention.

Figure 4A:
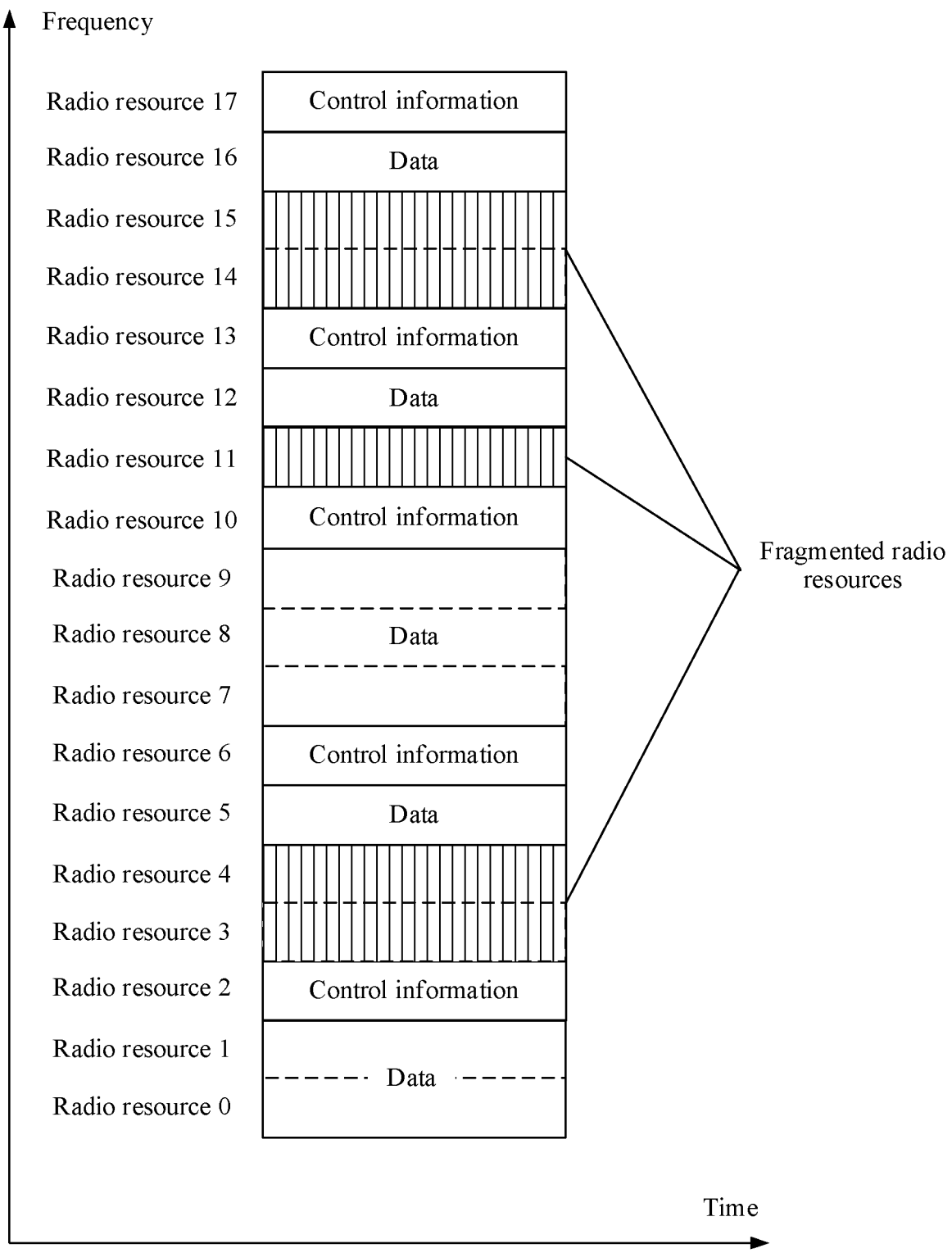
FIG. 4a is a schematic diagram of a radio resource fragment.
Figure 4B:
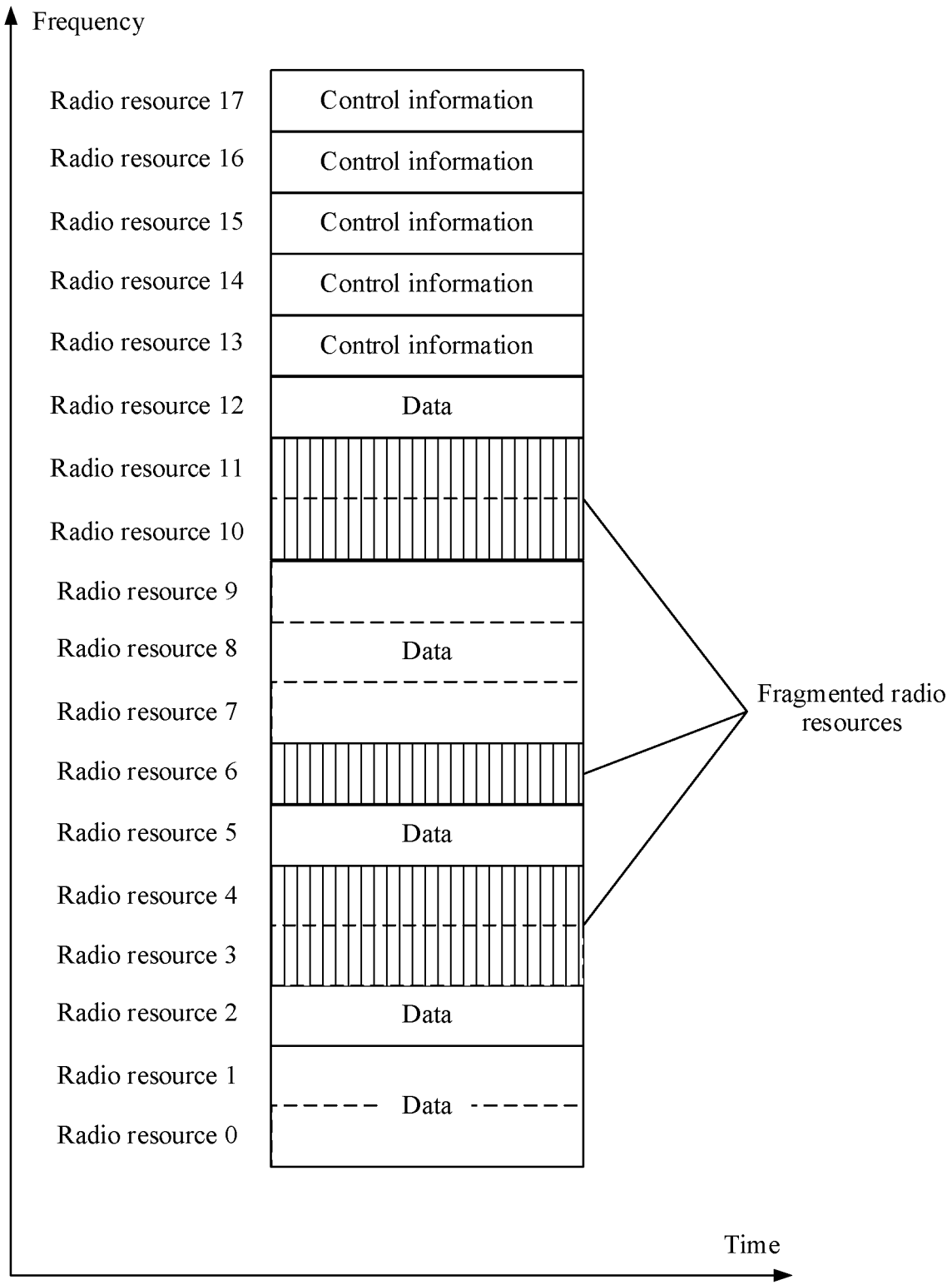
FIG. 4b is a schematic diagram of another radio resource fragment.

When a plurality of terminal devices working in a mode 4 listen to radio resources and send sidelink control information and/or data by using an available radio resource obtained through listening, available radio resources in a sidelink communication resource pool may be fragmented, to be specific, in the sidelink communication resource pool, a plurality of available radio resources that are nonconsecutive in frequency domain occur. For example, because different terminal devices do not coordinate with each other, fragmented radio resources may occur. For another example, when the terminal device continuously uses a radio resource (when there is information that needs to be sent) and releases a radio resource (when there is no information that needs to be sent), fragmented radio resources also occur. FIG. 4a and FIG. 4b are schematic diagrams of fragmented available radio resources. FIG. 4a is a schematic diagram of sending control information and data of a terminal device on radio resources that are consecutive in frequency domain. FIG. 4b is a schematic diagram of sending control information and data of a terminal device on radio resources that are nonconsecutive in frequency domain. In FIG. 4b, control information of a plurality of terminal devices is collectively sent on a plurality of radio resources (for example, radio resources 13 to 17) that are consecutive in frequency domain. As shown in FIG. 4a, a sidelink communication resource pool includes 18 radio resources, and the radio resources are sequentially numbered from 0 to 17 in ascending order of frequencies. The numbers may indicate positions, identifiers, or indexes of the radio resources. It may be understood that the radio resources may be numbered, identified, or indexed in another manner. This is not limited in the present invention. There are five available radio resources in total in the 18 radio resources included in the sidelink communication resource pool. However, the five radio resources are nonconsecutive in frequency domain, and three fragmented radio resources are formed: radio resources 3 to 4, a radio resource 11, and radio resources 14 to 15. When service data arrives at the terminal device, if three or more radio resources are required for transmitting the service data, because sidelink communication does not support data packet segmentation, and the terminal device is incapable of simultaneously using three fragmented (nonconsecutive in frequency domain) radio resources, the service data cannot be sent in a timely manner, and the fragmented radio resources are not fully used, resulting in a waste of resources.

To resolve the foregoing problem, the embodiments of the present invention provide a wireless communication method. When a quantity of available radio resources obtained by a first terminal device through listening is less than a quantity of required radio resources (namely, a quantity of target radio resources), the first terminal device sends a request to a second terminal device, to request the second terminal device to release at least one of radio resources that are currently used by the second terminal device. Correspondingly, the second terminal device that receives the request may release, based on the request, the at least one of radio resources used by the second terminal device, and may send a response to the terminal device that sends the request. If working in a mode 4, the second terminal device may autonomously release the at least one of radio resources used by the second terminal device. The second terminal device may alternatively reselect another radio resource to send information. If working in a mode 3, the second terminal device may send, to a network device, a request for releasing the at least one of radio resources used by the second terminal device and/or reselecting a radio resource, so that the network device releases the at least one of radio resources used by the second terminal device, and/or reselect a radio resource for the second terminal device. Then, the second terminal device releases, based on a response from the network device, the at least one of radio resources used by the second terminal device. The second terminal device may send information based on another radio resource reallocated by the network device. According to the method provided in the embodiments of the present invention, a terminal device is requested to release or adjust a radio resource occupied by the terminal device, so that nonconsecutive fragmented relatively small radio resources (that is, a plurality of fragmented radio resources) are adjusted to consecutive relatively large radio resources, thereby reducing radio resource fragments, and improving radio resource utilization. In addition, a success rate of sending control information or data by a terminal device having a relatively large data volume is also improved.

Figure 5:
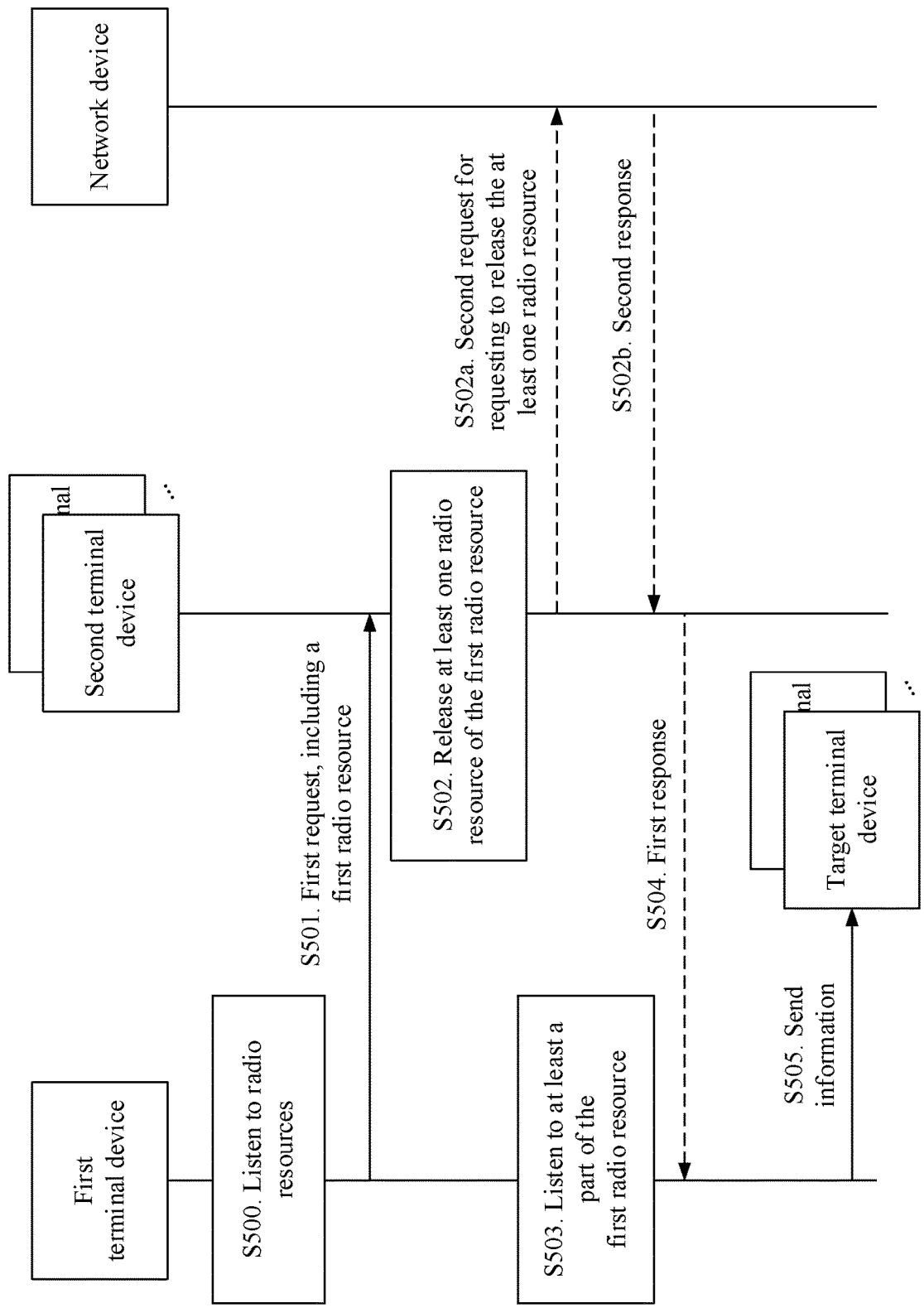
FIG. 5 is a schematic flowchart of a wireless communication method.
Figure 5A:
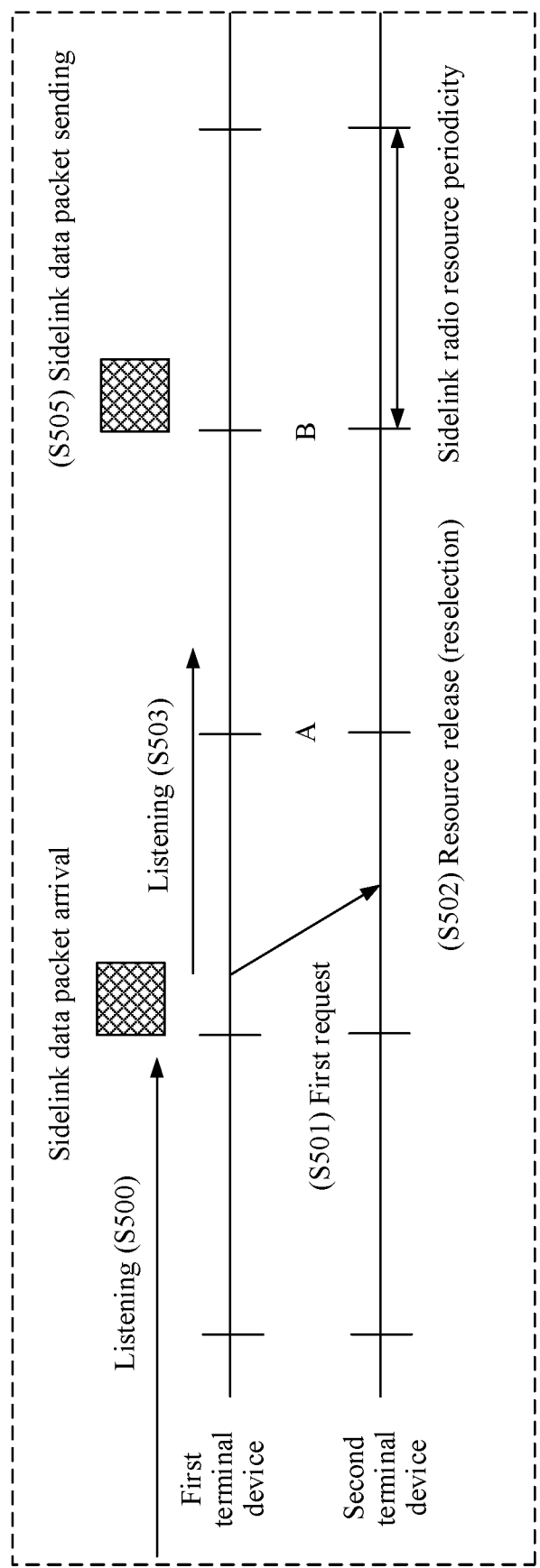
FIG. 5a is a schematic diagram of a time sequence of a wireless communication method.
Figure 5B:
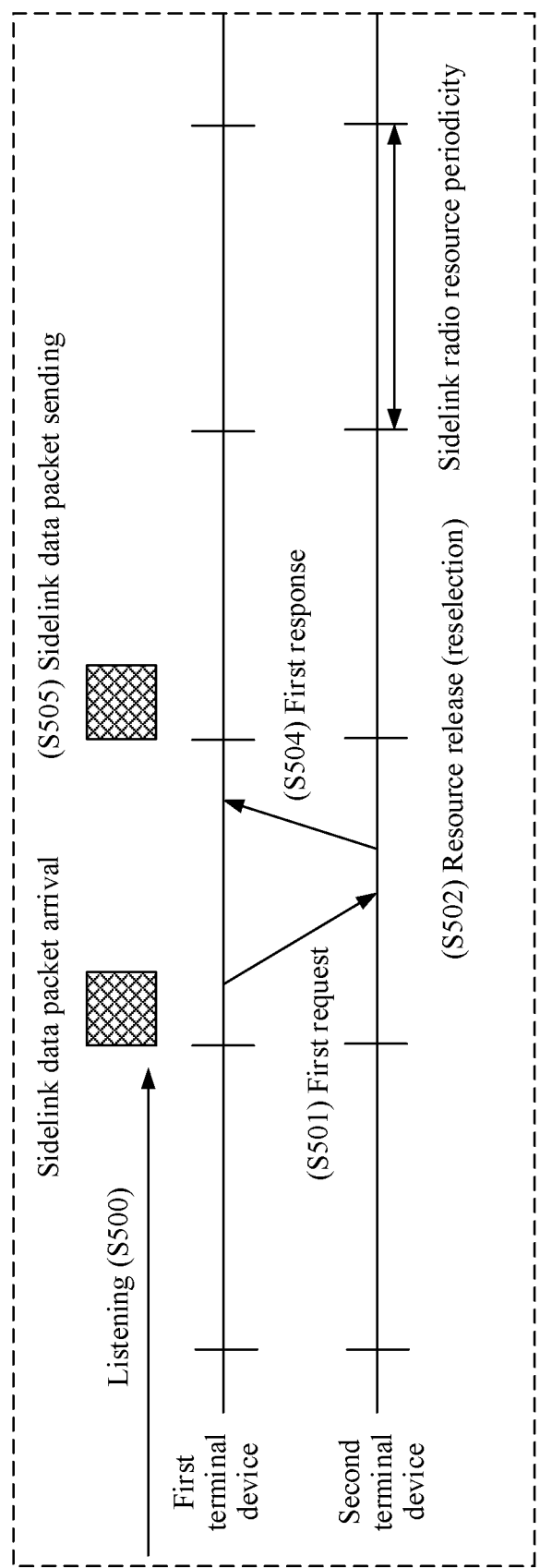
FIG. 5b is a schematic diagram of a time sequence of another wireless communication method.

FIG. 5 is a schematic flowchart of a wireless communication method. FIG. 5a is a schematic diagram of a time sequence of a wireless communication method. FIG. 5b is a schematic diagram of a time sequence of another wireless communication method.

An embodiment shown in FIG. 5 includes the following operations.

S500. A first terminal device listens to radio resources.

The first terminal device listens to a set of radio resources. The set of radio resources may be a sidelink communication resource pool, and includes a plurality of radio resources. For example, the sidelink communication resource pool shown in FIG. 4a includes a radio resource 0 to a radio resource 17. In a period of time, the radio resource 2, the radio resource 6, the radio resource 10, the radio resource 13, and the radio resource 17 are used to transmit control information. The radio resources 0 and 1, the radio resource 5, the radio resources 7 to 9, the radio resource 12, and the radio resource 16 are used to transmit data. The radio resources 3 and 4, the radio resources 11, and the radio resources 14 and 15 are available radio resources (also referred to as idle radio resources). A quantity of radio resources that are in the plurality of available radio resources and that are consecutive in frequency domain is relatively small (for example, in FIG. 4a, a maximum quantity of radio resources that are consecutive in frequency domain is two, such as the radio resources 3 and 4 and the radio resources 14 and 15). Therefore, the available radio resources may also be referred to as fragmented radio resources. The first terminal device may be any one of the terminal devices 111 to 114 in FIG. 1. For ease of description herein, an example in which the first terminal device is the terminal device 111 is used for description. In this case, the terminal devices 112 to 114 each may be considered as a second terminal device.

In the embodiments of the present invention, a radio resource may occupy a specific time length and a specific frequency domain width, so that the radio resource is also referred to as a time-frequency resource. For example, a radio resource may be a physical resource block (PRB), and one PRB may occupy a time length of 1 ms and a frequency domain width of 180 KHz. Alternatively, a radio resource may be a resource element (RE), and one RE occupies one orthogonal frequency division multiplexing (OFDM) symbol, a frequency domain width of 15 KHz, and the like. Alternatively, a radio resource may occupy a specific frequency width, and is also referred to as a frequency domain resource. For example, one PRB occupies 180 KHz bandwidth or 360 KHz bandwidth. Alternatively, a radio resource may occupy a specific time length. For example, one radio resource occupies 1 ms or 0.5 ms. This is not limited herein.

The first terminal device may consecutively listen to a plurality of (for example, 1000) unit time lengths. The unit time lengths may be subframes (Subframe), slots, mini-slots, symbols, transmission time intervals (TTI), or the like. This is not limited in the present invention.

The first terminal device obtains at least one second available radio resource set based on historical listening information (or based on a listening result).

In the embodiments of the present invention, for ease of description, an available radio resource set is defined to include at least one radio resource, and radio resources included in the available radio resource set are consecutive in frequency domain. A first available radio resource set, the second available radio resource set, or a third available radio resource set in the embodiments of the present invention is an available radio resource set. Further, radio resources included in any available radio resource set and radio resources included in another available radio resource set are nonconsecutive in frequency domain.

As shown in FIG. 4a, the first terminal device obtains three second available radio resource sets based on the historical listening information (or based on the listening result). The first one in the second available radio resource sets includes two radio resources (the radio resources 3 and 4) that are consecutive in frequency domain, the second one in the second available radio resource sets includes one radio resource (the radio resource 11), and the third one in the second available radio resource sets includes one radio resource (the radio resources 14 and 15). In addition, radio resources included in any one of the three second available radio resource sets and radio resources included in another one in the second available radio resource sets are nonconsecutive in frequency domain.

When needing to send sidelink data, the first terminal device determines whether at least one of the at least one second available radio resource set can be used for sending the sidelink data and/or scheduling information for scheduling the sidelink data (or determines whether a quantity of radio resources included in at least one of the at least one second available radio resource set is greater than or equal to (that is, not less than) a quantity of target radio resources, where the quantity of target radio resources is a quantity of radio resources required for sending the sidelink data and/or the scheduling information for scheduling the sidelink data). When the quantity of radio resources included in the at least one of the at least one second available radio resource set is greater than or equal to the quantity of target radio resources, the first terminal device determines that the sidelink data and/or the scheduling information for scheduling the sidelink data can be sent, and sends the sidelink data and/or the scheduling information for scheduling the sidelink data by using one second available radio resource set that can be used to send the sidelink data (or by using one or more radio resources in one second available radio resource set that can be used to send the sidelink data). When a quantity of radio resources included in each of the at least one second available radio resource set is less than the quantity of target radio resources, the first terminal device determines that the sidelink data and/or the scheduling information for scheduling the sidelink data cannot be sent, and performs operation S501. Alternatively, when a quantity of radio resources included in each available radio resource set of the at least one second available radio resource set is less than the quantity of target radio resources, and a total quantity of all radio resources included in the at least one second available radio resource set is greater than or equal to the quantity of target radio resources, the first terminal device performs operation S501.

The operation S500 may be implemented by a processor 304 in the first terminal device by controlling a transceiver 301.

S501. The first terminal device sends a first request to the second terminal device. Correspondingly, the second terminal device receives the first request sent by the first terminal device.

The first request is used to request the second terminal device to release a first radio resource. The second terminal device may be one or more of the terminal devices 112 to 114. The first radio resource may include one or more radio resources. Generally, the first radio resource is one or more radio resources currently used by the second terminal device.

The first request may include at least one of the following information:

(1) Indication Information Used to Indicate the First Radio Resource:

In one embodiment (a manner 1-1), the indication information may include a time domain position and/or a frequency domain position of the first radio resource, or an identifier, an index, or a number of the first radio resource in frequency domain and/or time-frequency domain (for example, the position, the identifier, the index, or the number may be one or more of numbers 0 to 17 of the radio resources shown in FIG. 4a). In this case, the first radio resource may include all radio resources currently used by the second terminal device, or may include a part of radio resources currently used by the second terminal device. Therefore, when radio resources included in the first radio resource are nonconsecutive in frequency domain, each radio resource in the first radio resource may be flexibly represented in this representation manner. Alternatively, the indication information may indicate a combination of a start position of radio resources and a quantity of the radio resources (for example, as shown in FIG. 4a, the start position of the radio resources that is included in the indication information is the radio resource 12, and the quantity of the radio resources is 3, so that the first radio resource indicated by the indication information is the radio resources 12 to 14). Therefore, when the radio resources included in the first radio resource are consecutive in frequency domain, signaling overheads of the indication information can be effectively reduced in this manner. Alternatively, the indication information may be represented in a manner of a combination of a plurality of start positions of radio resources and a quantity of the radio resources (for example, as shown in FIG. 4a, the first start position of the radio resources that is included in the indication information is the radio resource 12, a quantity of first radio resources is 3, the second start position of the radio resources is the radio resource 16, and a quantity of second radio resources is 2, so that the first radio resource indicated by the indication information is the radio resources 12 to 14 and the radio resources 16 and 17). Therefore, when the first radio resource includes a plurality of nonconsecutive radio resources, signaling overheads can be effectively reduced, and the nonconsecutive radio resources can also be flexibly represented by using a plurality of start radio resources and a quantity of radio resource blocks. In the manner 1-1, a same first request may be used to request a plurality of second terminal devices to release radio resources. For example, when needing to use six radio resources to transmit control information and/or data of the first terminal device 111, the first terminal device 111 may need to request at least two other terminal devices to release radio resources. If the terminal device 112 currently uses the radio resources 12 and 13 shown in FIG. 4a to send information, and the terminal device 113 currently uses the radio resources 16 and 17 shown in FIG. 4a to send information, the indication information in the first request may include the radio resources 12 and 13 and the radio resources 16 and 17. To be specific, the first terminal device requests the terminal device 112 to release the radio resources 12 and 13, and further requests the terminal device 113 to release the radio resources 16 and 17, so that the first terminal device can use six radio resources (for example, the radio resources 12 to 17) that are consecutive in frequency domain, to transmit information.

In one embodiment (a manner 1-2), the indication information is one-bit information, and when a bit value is 1, it indicates that the second terminal device is requested to release the first radio resource, and the first radio resource is all radio resources currently used by the second terminal device. Alternatively, the indication information does not even need the foregoing one-bit information. The indication information itself indicates that the second terminal device is requested to release the first radio resource, and the first radio resource is all radio resources currently used by the second terminal device. That is, in the manner 1-2, regardless of whether one bit is used for the first request, the first request does not indicate a specific position of a radio resource, but is only used to request the second terminal device to release the radio resources. After receiving the first request, the second terminal device may release the radio resources currently used by the second terminal device. In the manner 1-2, signaling overheads can be minimized. However, because a specific radio resource is not explicitly indicated, the second terminal device may perform an unnecessary radio resource release action.

(2) Identification Information or Group Identification Information of the Second Terminal Device:

Identification information of a terminal device is information that uniquely marks/identifies the terminal device within a specific range. The identification information may be a terminal identifier allocated to the terminal device by using a physical layer (physical layer), or a higher layer (higher layer), for example, a media access control (Media Access Control, MAC) layer, a radio resource control (Radio Resource Control, RRC) layer, or a layer higher than the RRC layer. For example, the identification information may be a cell radio network temporary identifier (Cell-Radio Network Temporary Identifier, C-RNTI) allocated by a base station to each terminal device, or an internet protocol (Internet Protocol, IP) address of the terminal device or allocated by a network. The first request may carry identification information of one or more second terminal devices, so that the second terminal device that receives the first request determines whether the first request includes a terminal identifier of the second terminal device, to implement a function of instructing the one or more second terminal devices to release a radio resource.

Group identification information of at least one another terminal device is a same group identifier allocated to a plurality of terminal devices. For example, the base station allocates a group radio network temporary identifier (Group-radio network temporary identifier, G-RNTI) to a group of terminal devices. Compared with signaling overheads of the first request carrying identification information of a plurality of terminal devices, signaling overheads of the first request can be effectively reduced in this manner. It may be understood that the first request may alternatively carry a plurality of pieces of group identification information, to request terminal devices in a plurality of groups to release radio resources.

Before sending the first request, the first terminal device obtains, through the listening process described in operation S500, information about the radio resources used by the second terminal device, for example, frequency domain positions of the radio resources used by the second terminal device, or time positions and frequency domain positions of the radio resources used by the second terminal device. For example, the first terminal device blindly detects sidelink control information SCI by using identification information of different terminal devices. When obtaining effective SCI through detection, the first terminal device may obtain, by decoding the SCI, the information about the radio resources used by the second terminal device. Further, according to this method, the first terminal device may obtain information about radio resources used by a plurality of second terminal devices. Therefore, when the first terminal device needs one or more other terminal devices (namely, the second terminal device in the embodiments of the present invention) to release a radio resource, the first terminal device may carry, to the first request, the identification information of the second terminal device. After the another terminal device receives the first request, if the another terminal device determines that the identification information included in the first request is the same as identification information of the another terminal device (that is, the first request includes the identification information of the another terminal device), the another terminal device determines that the first terminal device requests the another terminal device to release a resource (that is, the first radio resource) currently used by the another terminal device. Therefore, information about the first radio resource can be indicated provided that the first request carries the identification information of the first terminal.

Which manner of the foregoing two manners (the manner 1-1 and the manner 1-2) is used may be set based on a protocol requirement, or may be notified to the first terminal device and the second terminal device by a network device. This is not limited in the present invention.

(3) Sidelink Control Information SCI of the Second Terminal Device:

The sidelink control information SCI is control information that is obtained by the first terminal device through listening and that is sent by the second terminal device for carrying sidelink radio resource allocation/occupation information. The first terminal device may include, in the first request, SCI of the one or more second terminal devices.

Specifically, the first terminal device obtains the SCI of the second terminal device through blind detection. Then, the first terminal device includes, in the first request, the SCI of the second terminal device.

After receiving the first request, the one or more other terminal devices determine whether the SCI included in the first request is the same as SCI sent by the one or more other terminal devices. If the SCI included in the first request is the same as the SCI sent by the one or more other terminal devices, the one or more other terminal devices determine that the first terminal device requests the one or more other terminal devices to release the first radio resource, or determine that the one or more other terminal devices are the second terminal device.

(4) Time Information, where the Time Information is Used to Indicate an Effective Time of Releasing the First Radio Resource by the Second Terminal Device:

In one embodiment (a manner 4-1), the first request carrying the time information may be used to indicate that the first terminal device requests the second terminal device to release the first radio resource occupied by the second terminal device at a time point indicated by the time information. The time information indicates a time point. For example, the time information indicates a slot 100, and the first request carrying the time information is used to indicate that the second terminal device is requested to release a radio resource occupied by the second terminal device in the slot 100. The time information may alternatively indicate a plurality of time points. For example, the time information indicates a slot 100, a slot 150, and a slot 200, and the first request carrying the time information is used to indicate that the first terminal device requests the second terminal device to release radio resources occupied in the slot 100, the slot 150, and the slot 200. In the manner 4-1, when the plurality of time points are notified, signaling overheads are relatively high, but the time points are more precisely notified.

In one embodiment (a manner 4-2), the first request carrying the time information may be used to indicate that the first terminal device requests the second terminal device to release the first radio resource from a time point indicated by the time information. The first terminal device may obtain, by detecting SCI of the second terminal device, a plurality of time points at which the second terminal device occupies the first radio resource. Therefore, that the first terminal device enables the time information to include the first request may indicate that the first terminal device requests the second terminal device to release the first radio resource occupied from the indicated time point. For example, if obtaining that time points at which the second terminal device occupies radio resources are a slot 100, a slot 150, and a slot 200, the first terminal device determines that the time information indicates the slot 100, and the first request carrying the time information is used to indicate that the first terminal device requests the second terminal device to release the radio resources occupied by the second terminal device in the slot 100, the slot 150, and the slot 200. When the plurality of time points are notified, signaling overheads in the manner 4-2 are relatively low compared with those in the manner 4-1.

In one embodiment (a manner 4-3), the first request carrying the time information may be used to indicate that the first terminal device requests the second terminal device to release the first radio resource for N consecutive times from a time point indicated by the time information, where N is a positive integer. For example, assuming that the first terminal device detects that time points at which the second terminal device occupies the first radio resource are a slot 100, a slot 150, a slot 200, a slot 250, and the like (that is, a periodicity of occupying the first radio resource is 50 slots), the time information includes the slot 100 and 3 (to be specific, N=3), and the first request carrying the time information is used to indicate that the first terminal device requests the second terminal device to release the first radio resource occupied in the slot 100, the slot 150, and the slot 200. Compared with the manner 4-2, in the manner 4-3, slots in which the first radio resource is to be released are more precisely indicated.

Which one of the foregoing three manners (the manner 4-1, the manner 4-2, and the manner 4-3) is used may be set based on a protocol requirement, or may be notified to the first terminal device and the second terminal device by the network device. This is not limited in the present invention.

(5) Information about a radio resource that the second terminal device is recommended to select: Information about a radio resource that the second terminal device is recommended to select is provided, so that the second terminal device reselects a radio resource from the recommended radio resource, where the radio resource that the second terminal device is recommended to select includes at least one radio resource.

(6) Information about a radio resource that the second terminal device is recommended to avoid selecting: Information about a radio resource that the second terminal device is recommended to avoid selecting is provided, so that when reselecting a radio resource, the second terminal device does not select a radio resource in the radio resource that the second terminal device is recommended to avoid selecting, where the radio resource that the second terminal device is recommended to avoid selecting includes at least one radio resource.

(7) Information used to indicate a third radio resource, where the third radio resource does not include the first available radio resource set: Specifically, the first available radio resource set is at least one radio resource that the first terminal device expects to use to send information. That is, the first terminal device uses the first available radio resource set to send the information. After receiving the information, the second terminal device selects a radio resource from the third radio resource for transmitting data of the second terminal device, to avoid a conflict with the first available radio resource set.

(8) Information used to indicate a fourth radio resource, where the fourth radio resource includes the first available radio resource set: Specifically, the first available radio resource set is at least one radio resource that the first terminal device expects to use to send information. That is, the first terminal device uses the first available radio resource set to send the information. After receiving the information, the second terminal device selects a radio resource from the fourth radio resource for transmitting the data of the second terminal device, to avoid a conflict with the first available radio resource.

Two or more in the foregoing eight pieces of information included in the first request may be combined, to reduce more signaling overheads and more precisely indicate a radio resource that requests to be released. For example, a combination of the time information and the terminal identification information or the group identification information is used. For different services, periodicities in which a terminal device sends control information and/or data by using sidelink radio resources are different (for example, another terminal device 1 has two services, and periodicities are 50 milliseconds (Millisecond, ms) and 100 ms; that is, the another terminal device 1 respectively sends the two services at different time points by using the periodicity of 50 ms and the periodicity of 100 ms). If the first terminal device carries only the terminal identification information of the second terminal device, the second terminal device may release radio resources corresponding to the periodicity of 50 ms and the periodicity of 100 ms while the first terminal device expects to request the second terminal device to release only the radio resource corresponding to the periodicity of 100 ms. For another example, a combination of the time information and the indication information that indicates the first radio resource is used. If the indication information indicates only a frequency domain position of the first radio resource, a plurality of other terminal devices occupy the first radio resource at different time points. Therefore, the combination of the time information and the indication information that indicates the first radio resource needs to be used to more precisely indicate a specific time position of the first radio resource. Other combination manners are not described in detail.

From a perspective of the first terminal device, the first terminal device requests the second terminal device to release at least one radio resource in the first target radio resource set. However, from a perspective of the second terminal device, there is a requirement for the second terminal device to send information by using a radio resource. Therefore, the second terminal device further needs to reselect another radio resource to meet the requirement of the second terminal device. When another radio resource is reselected, if a radio resource selected by the second terminal device is inappropriate, a new radio resource fragment may be caused. In this case, the first terminal device still does not have sufficient resources to send information of the first terminal device.

Therefore, the first request carries any one or more pieces of information in (5) to (8) in addition to any one or more pieces of information in (1) to (4). This can help reduce new radio resource fragments caused after the second terminal device reselects a radio resource, and improve an opportunity for sending the information by the first terminal device.

The first terminal device sends the first request by using one of the at least one second available radio resource set. The first terminal device selects, from the at least one second available radio resource set, one second available radio resource set that can accommodate the first request. If a quantity of radio resources included in the selected second available radio resource set is greater than or equal to a quantity of radio resources required for sending the first request, the first terminal device determines, from the selected second available radio resource set, an appropriate radio resource (namely, at least a part of the resources) for sending the first request. If there are a plurality of second available radio resource sets that can be used for sending the first request, the first terminal device may select, from the plurality of second available radio resource sets, a second available radio resource set at a lowest frequency domain position, or a second available radio resource set at a highest frequency domain position, or a second available radio resource set that includes a smallest quantity of radio resources, or randomly select a second available radio resource set, for sending the first request, and a specific selection method is not limited in the present invention.

Further, the first request may be sent by using physical layer signaling, higher layer signaling, or data. The physical layer signaling may be sidelink control signaling, and the higher layer signaling or the data may be MAC layer signaling or data, RRC layer signaling or data, or signaling or data of the layer higher than the RRC layer. This is not limited in the present invention.

The sending operation and/or the receiving operation in S501 may be implemented by the transceiver 301 in the terminal device, or certainly may be implemented by the processor 304 in the terminal device by controlling the transceiver 301.

S502. The second terminal device releases the first radio resource based on the received first request message.

The second terminal device may directly release at least one radio resource in the first radio resource. For example, after receiving the first request, the second terminal device may release the at least one radio resource in the first radio resource based on the first request without needing to consider a requirement for sending information on a sidelink by the second terminal device, that is, without needing to first reselect a radio resource. Alternatively, the second terminal device may release the at least one radio resource in the first radio resource at a specific probability. For example, because the second terminal device has a requirement for sending the information on the sidelink, the second terminal device may not release the first radio resource occupied by the second terminal device. Therefore, the second terminal device may generate a random number from 0 to 1. When the generated random number is greater than (or less than) or equal to a preconfigured threshold, the at least one radio resource in the first radio resource is released. When the generated random number is less than (or greater than) a preconfigured threshold, the first radio resource is not released. It may be understood that different terminal devices may have different preconfigured thresholds used to separately control resource release probabilities of different terminals. The threshold is preset based on a protocol requirement, or is configured by a network device 101, or is set through negotiation with another terminal device. This is not limited in the present invention.

Because the second terminal device also has a requirement for sending control information and/or data, release of only the first radio resource causes a failure to send data of the second terminal device by the second terminal device. Therefore, before releasing the first radio resource, the second terminal device may reselect a radio resource, to be specific, reselect a required radio resource. Specifically, the second terminal device may directly reselect another radio resource. For example, after receiving the first request, the second terminal device starts to reselect the another radio resource. If a radio resource that can be used to send the data of the second terminal device is found through reselection, the second terminal device releases the at least one radio resource in the first radio resource. If no radio resource that can be used to send the data of the second terminal device is found through reselection, the second terminal device does not release the first radio resource. The second terminal device may alternatively reselect another radio resource at a specific probability. For example, the second terminal device may generate a random number from 0 to 1, and reselect a radio resource when the generated random number is greater than (or less than) or equal to a preconfigured threshold. If a radio resource that can be used to send the data of the second terminal device is found through reselection, the second terminal device releases the at least one radio resource in the first radio resource. If no radio resource that can be used to send the data of the second terminal device is found through reselection, the second terminal device does not release the first radio resource. If the generated random number is less than (or greater than) or equal to the preconfigured threshold, the second terminal device neither reselects a radio resource nor releases the first radio resource. A specific manner of setting a reselection probability is similar to that of setting a release probability, and details are not described herein again.

The second terminal device may reselect a radio resource from the radio resource indicated by the information about the radio resource that the second terminal device is recommended to select. Alternatively, the second terminal device may reselect a radio resource from a radio resource other than the radio resource indicated by the information about the radio resource that the second terminal device is recommended to avoid selecting. Alternatively, the second terminal device may reselect a radio resource from the third radio resource. Alternatively, the second terminal device may reselect a radio resource from a radio resource other than the fourth radio resource. Because the first request carries the foregoing auxiliary information, the second terminal device may select a radio resource from or beyond a radio resource indicated by the auxiliary information, so that conflicts (or overlaps) that cause the first terminal device incapable of sending information and that are between the radio resource reselected by the second terminal device and a radio resource that may be used by the first terminal device can be effectively reduced. For example, as shown in FIG. 4a, it is assumed that the first terminal device needs three radio resources to send the information, and the second terminal device uses the radio resources 16 and 17. If the second terminal device reselects the radio resources 14 and 15 based on the first request, the first terminal device still cannot obtain three radio resources that are consecutive in frequency domain to send the information. If the first request indicates that the second terminal device is recommended to reselect the radio resources 3 and 4, the second terminal device may reselect the radio resources 3 and 4. Therefore, the first terminal device may send data by using three radio resources that are consecutive in the radio resources 14 to 17. Alternatively, if the first request indicates that the second terminal device avoids selecting the radio resources 14 and 15, the second terminal device may reselect the radio resources 3 and 4. Therefore, the first terminal device may send data by using three radio resources that are consecutive in the radio resources 14 to 17.

When reselecting a radio resource, the second terminal device obtains one or more third available radio resource sets through listening. Radio resources included in each third available radio resource set are consecutive in frequency domain. The second terminal device sends information by using one of the one or more third available radio resource sets. The at least one third available radio resource set does not include the first radio resource, or the at least a part of the third available radio resource set used by the second terminal device for sending information is different from the first radio resource. In this way, conflicts that occur again can be effectively reduced after the radio resource is reselected. For example, the second terminal device determines, from the at least one third available radio resource set, a third available radio resource set that includes radio resources whose quantity is greater than or equal to a quantity of radio resources required for sending the information of the second terminal device, and determines, from the determined third available radio resource set, an appropriate resource to transmit the information of the second terminal device. Further, the radio resource that is in the determined third available radio resource and that is used for sending the information of the second terminal device is different from the first radio resource or the first radio resource set. As shown in FIG. 4a, assuming that the second terminal device uses the radio resources 16 and 17 for sidelink communication, and the first terminal device needs three radio resources that are consecutive in frequency domain, the terminal device requests, by using the first request, the second terminal device to release the radio resources 16 and 17. The second terminal device obtains three third available radio resource sets through listening, namely, the radio resources 3 and 4, the radio resource 11, and the radio resources 14 and 15, and the second terminal device may send the information of the second terminal device by using the radio resources 3 and 4.

When reselecting a radio resource, the second terminal device may select a radio resource in a third available radio resource set that meets a requirement and that includes a minimum quantity of radio resources. It may be understood that the requirement is that the reselected radio resource can be used for sending the information (for example, the control information and/or the data) of the second terminal device. In this way, fragmented radio resources can be fully used.

When reselecting a radio resource, the second terminal device may reselect at least one radio resource in a third available radio resource set that has a lowest (or highest) frequency or number and that meets the requirement. In this way, the radio resource with the highest (or lowest) frequency or number may be offered to the first terminal device for sending information.

The operation of S502 may be implemented by the processor 304 in the second terminal device, or may be together implemented by the processor 304 and the transceiver 301 that are in the second terminal device.

S502a. The second terminal device sends a second request to the network device. Correspondingly, the network device receives the second request sent by the second terminal device.

The second request is used to request the network device to release the first radio resource.

When the second terminal device works in a mode 3, because a radio resource used by the second terminal device for performing sidelink communication is allocated by the network device, after receiving the first request, the second terminal device in the mode 3 may send the second request to the network device, to request to release the first radio resource.

Because the second terminal device has the requirement for sending the control information and/or the data on the sidelink, the second request is further used for requesting the network device to reselect a radio resource for the second terminal device.

The second request includes indication information for releasing and/or reselecting a radio resource, to indicate the network device to release and/or reselect the radio resource for the second terminal device after receiving the indication information.

In one embodiment, the second request may include some or all content of the first request, or any one or more of the information (1) to (8) described in operation S501. For the information (1) to (8) described in operation S501, refer to the foregoing descriptions. Details are not described herein again.

Further, the second request may be physical layer signaling, MAC layer signaling, RRC signaling, or signaling of a layer higher than the RRC layer. This is not limited in the present invention.

The sending operation of the second terminal device in operation S502a may be implemented by the transceiver 301 in the second terminal device, or certainly may be implemented by the processor 304 in the second terminal device by controlling the transceiver 301.

The receiving operation of the network device in operation S502a may be implemented by a transceiver 202 in the network device 101, or certainly may be implemented by a controller/processor 201 in the network device 101 by controlling a transceiver 202.

S502b. The network device sends a second response to the terminal device. Correspondingly, the second terminal device receives the second response sent by the network device.

Before sending the second response, the network device may reselect a radio resource for the second terminal device. Specifically, the network device reselects a radio resource for the second terminal device based on a current radio resource usage status and a requirement of the second terminal device. If the radio resource reselection succeeds, the network device sends the second response to the second terminal device. If the reselection does not succeed, the network device does not send the second response to the second terminal device, or the network device sends indication information used to indicate the second terminal device to use an original radio resource, or a radio resource included in the second response is the same as a radio resource originally used by the second terminal device, or the network device sends, to the second terminal device, indication information used for refusing to release a radio resource.

The second response is used to notify the second terminal device of at least one of the following information:

releasing the first radio resource or at least one radio resource in the first radio resource; and at least one radio resource reselected for the second terminal device.

The second response may be new scheduling information, and the scheduling information is used for allocating at least one new radio resource to the second terminal device. The at least one new radio resource may be partially different from or completely different from at least one radio resource (that is, the first radio resource) originally used by the second terminal device. This is not limited in the present invention. The scheduling information may be used to implicitly indicate which radio resources are released, thereby reducing signaling overheads.

The second response may be physical layer signaling, MAC layer signaling, RRC signaling, or signaling of a layer higher than the RRC layer. This is not limited in the present invention.

The sending operation of the network device in operation S502b may be implemented by the transceiver 202 in the network device 101, or certainly may be together implemented by the controller/processor 201 and the transceiver 202 that are in the network device 101. In this operation, the operation in which the network device reselects the radio resource for the second terminal device may be implemented by the controller/processor 201.

The receiving operation of the second terminal device in operation S502b may be implemented by the transceiver 301 in the second terminal device, or certainly may be implemented by the processor 304 in the second terminal device by controlling the transceiver 301.

It should be noted that operations S502a and S502b are optional. When a mode that the second terminal device works on is a mode (namely, the mode 3) in which the radio resource used for performing the sidelink communication is allocated by the network device, operations S502a and S502b may be used. When a mode that the second terminal device works on is a mode (namely, a mode 4) in which the radio resource used for performing the sidelink communication is allocated/preempted by the terminal device, operations S502a and S502b may not need to be performed.

S503. The first terminal device listens to the at least one radio resource in the first radio resource, and determines the first available radio resource set based on a listening result, where the first available radio resource set includes the at least one radio resource in the first radio resource.

After sending the first request, the first terminal device listens to the at least one radio resource in the first radio resource. Specifically, the first terminal device listens whether the second terminal device uses (occupies) the at least one radio resource in the first radio resource at a next sending moment (such as a moment corresponding to a point A in FIG. 5a). Alternatively, the first terminal device listens whether the at least one radio resource in the first radio resource is used (occupied) at a next sending moment (such as a moment corresponding to a point A in FIG. 5a) of the second terminal device. It should be noted that the first terminal device may also listen some sending moments of the second terminal device. This is not limited in the present invention. Operation S503 may be different from operation S500. In operation S500, listening is performed for a relatively long time (such as 1000 time units), and in operation S503, listening to the at least one radio resource in the first radio resource is performed for a short time, for example, listening in time of one periodicity (for example, the periodicity of 50 slots that is mentioned in the information (4) in operation S501), or listening until a first response is obtained. Through listening performed for a short time, the first terminal device can quickly use the at least one radio resource in the first radio resource.

The first terminal device further listens to at least one radio resource other than the first radio resource.

When the first terminal device listens to the at least one radio resource other than the first radio resource, a listening manner may be the same as the listening manner in operation S500, and details are not described herein again.

The operation of operation S503 may be implemented by the transceiver 301 in the first terminal device, or certainly may be implemented by the processor 304 in the first terminal device by controlling the transceiver 301.

S504. The second terminal device sends the first response to the first terminal device. Correspondingly, the first terminal device receives the first response sent by the second terminal device (as shown in FIG. 5 and FIG. 5b).

The first response is used to indicate information that the at least one radio resource in the first radio resource is released.

Specifically, the first response includes at least one of the following information:

A piece of the information is indication information used to indicate to release the first radio resource. For example, the indication information carries one bit. When a value of the one bit is 1, it indicates that the first radio resource is released. When a value of the one bit is 0, it indicates that the first radio resource is not released. This manner is simple, and signaling overheads are reduced.

A piece of the information is indication information used to indicate to release a fifth radio resource, where the fifth radio resource is a part of the first radio resource. This manner is flexible, and the at least one released radio resource can be precisely represented in this manner.

Apiece of the information is indication information used to indicate to release a sixth radio resource, where the first radio resource is a part of the sixth radio resource. This manner is flexible, and the at least one released radio resource can be precisely represented in this manner.

A piece of the information is information used to indicate a seventh radio resource, where the seventh radio resource does not include the first radio resource. This manner is flexible, and the at least one released radio resource can be precisely represented in this manner.

Further, the first response may be physical layer signaling, MAC layer signaling, RRC signaling, or signaling of a layer higher than the RRC layer. This is not limited in the present invention.

The operation of sending the first response in this operation may be implemented by the transceiver 301 in the second terminal device, or certainly may be implemented by the processor 304 in the second terminal device by controlling the transceiver 301.

Correspondingly, the operation of receiving the first response in this operation may be implemented by the transceiver 301 in the first terminal device, or certainly may be implemented by the processor 304 in the first terminal device by controlling the transceiver 301.

It should be indicated that operations S503 and S504 are optional. To be specific, in an implementation, the first terminal device may perform only S503 (listening), and does not need to receive the first response. A corresponding time sequence is shown in FIG. 5a. For example, if obtaining, through listening, that the second terminal device does not occupy the at least one radio resource in the first radio resource at the moment A in FIG. 5a, the first terminal device determines that the at least one radio resource in the first radio resource is available at the moment B in FIG. 5a. A time interval from the moment A to the moment B is a periodicity in which the second terminal device sends information on the sidelink (for example, the periodicity of 50 slots that is mentioned in the information (4) in operation S501). In one embodiment, the first terminal device may attempt to perform only S504 (receiving the first response) without listening. A corresponding time sequence relationship may be shown in FIG. 5b. In one embodiment, the first terminal may perform S503 and S504. To be specific, the first terminal device performs listening and also receives the first response. Before receiving the first response, the first terminal device listens to the at least one radio resource in the first radio resource (that is, S503). After receiving the first response, the first terminal device may no longer listen to the at least one radio resource in the first radio resource.

S505. The first terminal device determines the first available radio resource set, and sends information by using the first available radio resource set.

The first terminal device determines the first available radio resource set according to operation S503 and/or S504.

The first available radio resource set includes one or more radio resources. The first available radio resource set includes one or more radio resources in the first radio resource. The first available radio resource set may further include at least a part of the at least one second available radio resource set. That the first terminal device sends the information to the target terminal device by using the first available radio resource set may specifically be: The first terminal device sends sidelink control signaling and/or data by using at least a part of radio resources in the first available radio resource set. Further, the sidelink control signaling is scheduling assignment (Scheduling Assignment, SA). The target terminal device may be any one of the terminal devices 112 to 114 shown in FIG. 1. This is not limited in the present invention.

The operation of operation S505 may be implemented by the transceiver 301 in the first terminal device, or certainly may be together implemented by the processor 304 and the transceiver 301 that are in the first terminal device.

The first terminal device, the second terminal device, and the network device perform the method in the embodiments of the present invention, so that nonconsecutive fragmented relatively small radio resources can be adjusted to consecutive relatively large radio resources, thereby reducing radio resource fragments. Therefore, the terminal device can send the control information and/or the data in a timely manner, thereby improving radio resource utilization.

An example of the present invention further provides a processor-readable storage medium, including an instruction. When the instruction is run on a processor, the foregoing method is implemented. When the processor executes the method in the embodiments of the present invention, a sending action may be that an input/output port of the processor outputs a baseband signal that carries to-be-sent information, and a receiving action may be that the input/output port of the processor receives a baseband signal that carries to-be-received information. It may be understood that the processor-readable storage medium provided in this embodiment of the present invention may also be a computer-readable storage medium.

An example of the present invention further provides an apparatus (for example, an integrated circuit, a wireless device, or a circuit module) that is configured to implement the foregoing method. The apparatus includes a processor and a memory connected to the processor. The memory is configured to store an instruction. The processor is configured to read and execute the instruction stored in the memory, so that the apparatus performs the foregoing method. The apparatus described in this specification may be a self-supporting device or may be a part of a larger device. The device may be: (i) an independent IC, (ii) a set of one or more ICs, where the set may include a memory IC configured to store data and/or an instruction, (iii) an RFIC such as an RF receiver or an RF transmitter/receiver, (iv) an ASIC such as a mobile station modem, (v) a module that can be embedded in another device, (vi) a receiver, a cellular phone, a wireless device, a hand-held phone, or a mobile unit, or (vii) others.

The method and apparatus that are provided in the embodiments of the present invention may be applied to a terminal device or an access network device (or a network device) (which may be collectively referred to as a wireless device). The terminal device, the access network device, or the wireless device may include a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more computer operating systems, for example, a Linux operating system, a Unix operating system, an Android operating system, an iOS operating system, or a Windows operating system, that process a service through a process. The application layer includes applications such as a browser, an address book, word processing software, and instant messaging software. In addition, a specific structure of an execution body of the method is not limited in the embodiments of the present invention, provided that the execution body can perform communication based on the signal transmission method in the embodiments of the present invention by running a program that records code of the method in the embodiments of the present invention. For example, the wireless communication method in the embodiments of the present invention may be performed by the terminal device or the access network device, or a function module that is in the terminal device or the access network device and that can invoke and execute a program.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the embodiments of the present invention.

In addition, aspects or features in the embodiments of the present invention may be implemented as a method, an apparatus or a product that uses standard programming and/or engineering technologies. The term "product" used in this application covers a computer program that can be accessed from any computer-readable device, carrier or medium. For example, the computer-readable medium may include but is not limited to: A magnetic storage device (for example, a hard disk, a floppy disk or a magnetic tape), an optical disc (for example, a compact disc (CD), a digital versatile disc (DVD), a smart card, and a flash memory device (for example, erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, include, and/or carry an instruction and/or data.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (such as a coaxial cable, an optical fiber, or a digital subscriber line (DSL)) or wireless (such as infrared, radio, or microwave) manner. The computer-readable storage medium may be any usable medium accessible by a computer, or a data storage device, such as a server or a data center, integrating one or more usable media. The usable medium may be a magnetic medium (such as a floppy disk, a hard disk, or a magnetic tape), an optical medium (such as a DVD), a semiconductor medium (such as a solid-state drive (SSD)), or the like.

It should be understood that sequence numbers of the foregoing processes do not mean execution sequences in various embodiments of the present invention. The execution sequences of the processes should be determined based on functions and internal logic of the processes, and should not be construed as any limitation on the implementation processes of the embodiments of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

When the functions are implemented in the form of a software function unit and sold or used as an independent product, the functions may be stored in a computer-readable storage medium. Based on such an understanding, the technical solutions of the embodiments of the present invention essentially, or the part contributing to the prior art, or some of the technical solutions may be implemented in a form of a software product. The software product is stored in a storage medium, and includes several instructions for instructing a computer device (which may be a personal computer, a server, an access network device, or the like) to perform all or some of the operations of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the embodiments of the present invention, but are not intended to limit the protection scope of the embodiments of the present invention. Any variation or replacement readily figured out by a person skilled in the art within the technical scope disclosed in the embodiments of the present invention shall fall within the protection scope of the embodiments of the present invention.

What is claimed is:

1. A wireless communication method, comprising:
listening, by a first terminal device, to radio resources to obtain one or more second available radio resource sets that are nonconsecutive in frequency domain, wherein radio resources comprised in each second available radio resource set are consecutive in frequency domain;
sending, by the first terminal device, a first request to a second terminal device to release a first radio resource currently utilized by the second terminal device;
determining, by the first terminal device, a first available radio resource set, wherein the first available radio resource set comprises at least a part of the first radio resource and at least one of the one or more second available radio resource sets, and radio resources comprised in the first available radio resource set are consecutive in frequency domain; and
sending, by the first terminal device, information by using the first available radio resource set.

2. The method according to claim 1, wherein the first request comprises at least one of
indication information used to indicate the first radio resource;
identification information or group identification information of the second terminal device;
sidelink control information of the second terminal device;
time information, wherein the time information is used to indicate an effective time of releasing the first radio resource;
information about a radio resource that the second terminal device is recommended to select;
information about a radio resource that the second terminal device is recommended to avoid selecting;
information used to indicate a third radio resource, wherein the third radio resource does not comprise the first available radio resource set; or
information used to indicate a fourth radio resource, wherein the fourth radio resource comprises the first available radio resource set.

3. The method according to claim 1,
wherein a quantity of radio resources comprised in each second available radio resource set is less than a quantity of target radio resources.

4. The method according to claim 3, wherein the sending, by the first terminal device, the first request comprises:
sending, by the first terminal device, the first request by using one of the at least one second available radio resource set.

5. The method according to claim 3, wherein
the first available radio resource set comprises the at least a part of the first radio resource and a part of the at least one second available radio resource set, and a quantity of radio resources comprised in the first available radio resource set is greater than or equal to the quantity of target radio resources.

6. The method according to claim 1, wherein before the determining, by the first terminal device, a first available radio resource set, the method further comprises:
listening, by the first terminal device, to the at least a part of the first radio resource.

7. The method according to claim 1, wherein before the determining, by the first terminal device, a first available radio resource set, the method further comprises:
receiving, by the first terminal device, a first response sent by the second terminal device, wherein the first response comprises at least one of
indication information used to indicate to release the first radio resource;
indication information used to indicate to release a fifth radio resource, wherein the fifth radio resource is a part of the first radio resource;
indication information used to indicate to release a sixth radio resource, wherein the first radio resource is a part of the sixth radio resource; or
information used to indicate a seventh radio resource, wherein the seventh radio resource does not comprise the first radio resource.

8. A wireless communication method, comprising:
receiving a first request from a first terminal device at a second terminal device, wherein the first request is used to request the second terminal device to release a first radio resource currently utilized by the second terminal device, wherein a first available radio resource set comprises at least a part of the first radio resource and at least one of one or more second available radio resource sets, wherein the one or more second available radio resource sets are nonconsecutive in frequency domain, and radio resources comprised in the first available radio resource set are consecutive in frequency domain;

listening, by the second terminal device, to radio resources to obtain at least one third available radio resource set, wherein radio resources comprised in each third available radio resource set are consecutive in frequency domain; and sending, by the second terminal device, information by using one of the at least one third available radio resource set; and releasing, by the second terminal device, the first radio resource based on the first request.

9. The method according to claim 8, wherein the first request comprises at least one of
indication information used to indicate the first radio resource;
identification information or group identification information of the second terminal device;
sidelink control information of the second terminal device;
time information, wherein the time information is used to indicate an effective time of releasing the first radio resource;
information about a radio resource that the second terminal device is recommended to select;
information about a radio resource that the second terminal device is recommended to avoid selecting;
information used to indicate a third radio resource, wherein the third radio resource does not comprise the first radio resource; or
information used to indicate a fourth radio resource, wherein the fourth radio resource comprises the first radio resource.

10. The method according to claim 8, wherein the at least one third available radio resource set does not comprise the first radio resource.

11. The method according to claim 8, wherein after the receiving, by the second terminal device, the first request, the method further comprises:
sending, by the second terminal device, a second request to a network device, wherein the second request comprises at least one of
indication information used to indicate the first radio resource;
identification information or the group identification information of the second terminal device;
sidelink control information of the second terminal device;
time information, wherein the time information is used to indicate the effective time of releasing the first radio resource;
information about a radio resource that the network device is recommended to select for the second terminal device;
information about a radio resource that the network device is recommended to avoid selecting for the second terminal device;
information used to indicate an eighth radio resource, wherein the eighth radio resource does not comprise the first radio resource; or
information used to indicate a ninth radio resource, wherein the ninth radio resource comprises the first radio resource.

12. The method according to claim 11, further comprising:
receiving, by the second terminal device, a second response sent by the network device, wherein the second response comprises at least one of
indication information used to indicate to release the first radio resource;
indication information used to indicate to release a tenth radio resource, wherein the tenth radio resource is a part of the first radio resource;
indication information used to indicate to release an eleventh radio resource, wherein the first radio resource is a part of the eleventh radio resource; or
information used to indicate a twelfth radio resource, wherein the twelfth radio resource does not comprise the first radio resource.

13. The method according to claim 8, further comprising:
sending, by the second terminal device, a first response, wherein the first response comprises at least one of
indication information used to indicate to release the first radio resource;
indication information used to indicate to release a fifth radio resource, wherein the fifth radio resource is a part of the first radio resource;
indication information used to indicate to release a sixth radio resource, wherein the first radio resource is a part of the sixth radio resource; or
information used to indicate a seventh radio resource, wherein the seventh radio resource does not comprise the first radio resource.

14. A wireless communications apparatus, comprising a processor and a transceiver coupled to the processor, wherein
the processor is configured to listen to radio resources via the transceiver to obtain one or more second available radio resource sets that are nonconsecutive in frequency domain, wherein radio resources comprised in each second available radio resource set are consecutive in frequency domain;
the transceiver is configured to send a first request to a second terminal device to release a first radio resource currently utilized by the second terminal device;
the processor is configured to determine a first available radio resource set, wherein the first available radio resource set comprises at least a part of the first radio resource and at least one of the one or more second available radio resource sets, and radio resources comprised in the first available radio resource set are consecutive in frequency domain; and
the transceiver is further configured to send information by using the first available radio resource set.

15. The wireless communications apparatus according to claim 14, wherein the first request comprises at least one of the following:
indication information used to indicate to release a radio resource;
identification information or group identification information of the second terminal device;
sidelink control information of the second terminal device;
time information, wherein the time information is used to indicate an effective time of releasing the first radio resource;
information about a radio resource that the second terminal device is recommended to select;
information about a radio resource that the second terminal device is recommended to avoid selecting;

information used to indicate a third radio resource, wherein the third radio resource does not comprise the first available radio resource set; or information used to indicate a fourth radio resource, wherein the fourth radio resource comprises the first available radio resource set.

16. The wireless communications apparatus according to claim 14,
wherein a quantity of radio resources comprised in each second available radio resource set is less than a quantity of target radio resources.

17. The wireless communications apparatus according to claim 16, wherein the transceiver is further configured to send
the first request by using one of the at least one second available radio resource set.

18. The wireless communications apparatus according to claim 16, wherein
the first available radio resource set comprises the at least a part of the first radio resource and a part of the at least one second available radio resource set, and a quantity of radio resources comprised in the first available radio resource set is greater than or equal to the quantity of target radio resources.

19. The wireless communications apparatus according to claim 14, wherein the processor is further configured to:
before determining the first available radio resource set, listen to the at least a part of the first radio resource via the transceiver.

20. The wireless communications apparatus according to claim 14, wherein the processor is further configured to:
before determining the first available radio resource set, receive, via the transceiver, a first response sent by the second terminal device, wherein the first response comprises at least one of indication information used to indicate to release the first radio resource;

indication information used to indicate to release a fifth radio resource, wherein the fifth radio resource is a part of the first radio resource;

indication information used to indicate to release a sixth radio resource, wherein the first radio resource is a part of the sixth radio resource; or information used to indicate a seventh radio resource, wherein the seventh radio resource does not comprise the first radio resource.

* * * * *